United States Patent [19]

McKay

[11] Patent Number: 4,554,945
[45] Date of Patent: Nov. 26, 1985

[54] LIQUID METERING APPARATUS

[75] Inventor: Michael L. McKay, Willeton, Australia

[73] Assignee: Orbital Engine Company Proprietary Limited, Balcatta, Australia

[21] Appl. No.: 532,035

[22] PCT Filed: Dec. 30, 1982

[86] PCT No.: PCT/AU82/00225
§ 371 Date: Aug. 26, 1983
§ 102(e) Date: Aug. 26, 1983

[87] PCT Pub. No.: WO83/02319
PCT Pub. Date: Jul. 7, 1983

[30] Foreign Application Priority Data

Dec. 31, 1981 [AU] Australia ............... PF2123

[51] Int. Cl.[4] .................. G01F 11/38; F02M 67/00
[52] U.S. Cl. ............................ 137/312; 123/531; 123/533
[58] Field of Search ............. 123/531, 533; 137/312

[56] References Cited

U.S. PATENT DOCUMENTS

| 1,868,767 | 7/1932 | Ross | 123/531 |
| 2,706,976 | 4/1955 | Gianini | 123/533 X |
| 4,376,423 | 3/1983 | Knapstein | 123/533 X |

FOREIGN PATENT DOCUMENTS 523968  5/1982  Australia .

Primary Examiner—George L. Walton
Attorney, Agent, or Firm—Murray, Whisenhunt and Ferguson

[57] ABSTRACT

The fuel injection apparatus includes fuel a fuel metering chamber, an air supply chamber and a further chamber formed in a rigid body. A metering member is slidable within the fuel and gas chambers and passes through the further chamber. The amount of fuel fed to the metering chamber via valve means is controlled by the position of the metering member. An increase in pressure in the air supply chamber opens a valved passage in the metering member and the air expels the fuel from the metering chamber via check valve means. The further chamber collects any leakage of air or fuel past bearing means that receives the metering member.

15 Claims, 5 Drawing Figures

LIQUID METERING APPARATUS

This invention relates to an improved apparatus for delivering metered quantities of liquid such as fuel to an internal combustion engine.

In the following discussion of the invention and description of the practical arrangements specific reference is made to the apparatus for metering fuel but it is to be understood that the invention is not limited to that particular application.

One problem with many known apparatuses for delivering metered quantities of fuel is the leakage of fuel, and this problem is increased by the relatively high pressures used to inject the metered quantity of fuel. In currently used apparatus the pressure is commonly developed by a mechanical mechanism, such as a piston, which acts directly on the fuel. These constructions require the provision of effective seals between the piston and the chamber in which it operates, as leakage past the piston substantially influences the metering accuracy. It will be appreciated that the metered quantity of fuel each cycle is relatively small and thus any degree of leakage can significantly influence the accuracy of the fuel metering.

In French Patent No. 521309 there is disclosed a carburettor pump for two-stroke engines wherein there is delivered a charge of air under pressure to the working cylinder of the engine, and a measured quantity of fuel is picked up by the charge of air as the air travels to the working cylinder of the engine.

Accordingly, the fuel is not truly injected but is merely moved to a position within the stream of air, and that stream of air basically atomizes and/or vaporises the fuel so that it becomes entrained in the stream of air.

As the disclosure in this specification is not related to a true injector system, the fuel will only be subjected to relatively low pressures, particularly as the fuel is not required at any stage to be injected into the working cylinder of the engine against the pressures in the working cylinder. Accordingly, the sealing problems and the fine tolerances which are encountered in normal fuel injection systems would not be present in the system disclosed in this specification.

In addition, the chamber in which the quantity of fuel is measured is required to be moved into and out of the passage of the air once each revolution of the engine. There would thus be considerable wear of the working parts, which must lead to fuel leakage and in this construction leakage results in loss of accuracy in the quantity of fuel delivered. Also the degree of movement necessary and the speed and frequency of that movement, result in substantial inertia forces associated with the movement, which adversely affect the accuracy of fuel metering.

French Patent No. 2050728 discloses a true fuel injection metering arrangement wherein the fuel is displaced from a metering chamber by a gas under high pressure that injects the measured quantity of fuel into the working chamber of the engine. Apart from its high pressure operation, in most other regards, the injection system of this prior specification is very similar to that of French Patent No. 521309. It still requires the chamber that effects the metering of the fuel to be moved between a position in which it receives the fuel to a position at which the fuel is discharged from the chamber by high pressure gas.

The difference between the two French constructions is that in one the member carrying the chamber is subjected to a reciprocating movement, whereas, in the other it is subjected to a rotatory movement. The extent of the movement of the member carrying the chamber in French Patent No. 2050728 is relatively small which is desirable from the point of view of reducing wear, however, it is not a continuous rotary motion but an oscilatory motion. The chamber member would, during each cycle, oscillated through one-quarter of a revolution in each direction with a stationary period between each movement. This type of intermittent movement does of course increase the rate of wear between the mating moving surfaces, and hence the maintaining of an effective seal between the two moving components would still be a major problem. Also, as previously referred to, inertia forces are involved which have an adverse effect on metering accuracy.

It is seen that the constructions disclosed in both the French patents use a chamber formed in a movable member that must go through one cycle of movement for each delivery of fuel. The French constructions therefore basically have the same problems as always exist where it is endeavoured to contain the measured quantity of fuel in a chamber formed in or by a movable member and then effect movement of that member when the delivery of fuel is required. Thus, both of the proposed French constructions have all of the problems associated with the conventional fuel injection system, including manufacturing to close tolerances to obtain required sealing, the wear arising from high speed and high frequency operation, and the effects of enertia forces on metering accuracy.

U.S. Pat. No. 2,280,317 proposes a fuel metering system wherein a measured quantity of fuel is located within a chamber, and compressed air is admitted to the chamber to displace the fuel from therefrom into the working cylinder of the engine. In this proposal a piston type compressor is driven by the engine to deliver the compressed air to the chamber in timed relation to the engine cycle, and the quantity of fuel in the chamber is mechanically controlled.

In one embodiment the period of admission of fuel to the chamber is varied to control the quantity of fuel delivered, and in another embodiment the total capacity of the chamber is varied. Both embodiments are described with manual actuation for the fuel quantity control, and it is clear that the mechanisms are intended for substantially steady speed operation with gradual speed changes when required. Constructions based on these proposals would not be acceptable in normal road vehicle applications, and particularly in automotive applications in which substantial engine speed and load variation are encountered, and rapid response is required.

There is disclosed in Australian Patent No. 523,968, an apparatus for metered quantities of fuel to an engine wherein air under pressure is admitted to a chamber, containing the measured quantity of fuel, to displace the fuel from the chamber. This avoids the necessity of a pressure inducing piston and hence the need to maintain an effective piston seal as required in current commercial fuel injection systems.

In said Australian Patent, the quantity of fuel delivered in each cycle is regulated by varying the volume of fuel displaced by the admission of the air to the chamber. In one embodiment the fuel capacity of the chamber is adjusted, and in another the volume of the chamber between the point of entry of the gas and the point of discharge of fuel from the chamber is adjusted. These embodiments are constructed for high speed operation such as is necessary in road vehicle operation, where frequent and substantial variation in metered quantity of fuel are required, and yet require the minimum use of precision components.

The embodiment wherein the metered quantity of fuel is controlled by the relative positions of the points of entry of the gas and discharge of the fuel, is particularly suitable for road vehicle use because of the capability of accuracy and repeatability over a wide range of metered quantities. However, the mechanism disclosed for controlling the position of the member carrying the gas inlet, which member projects into the chamber housing the metered quantity of fuel, requires an effective seal between the member and the wall of the chamber through which the member projects. Also the various static and kinetic forces to which the member is subjected, during movement to adjust the metered quantity of fuel, can adversely affect the accuracy of the metering, particularly in regard to repeatability.

It is therefore the object of the present invention to provide an apparatus for delivering metered quantities of liquid wherein the construction is simplified, the efficiency and accuracy improved, and the potential hazards arising from leakage is reduced.

With the object in view there is provided an apparatus for delivering metered quantities of liquid comprising:

a rigid body having a metering chamber and a gas supply chamber formed therein;

a metering member supported in the body for linear movement relative thereto and adapted to provide gas flow communication between the gas supply and metering chambers;

said metering member extending into the metering chamber in the direction of said linear movement, means to control the linear movement of the metering member in the body to regulate the extent of projection thereof into the metering chamber;

a further chamber in said body interposed between said gas supply and metering chambers so that the metering member extends therethrough;

means communicating with said metering chamber and connectable to a liquid source to permit supply of liquid to the metering chamber; and means carried by the metering member and operable to selectively establish said gas flow communication between the metering and gas supply chambers, whereby liquid is displaceable from the metering chamber by gas from the gas supply chamber.

Conveniently, the means to establish said gas flow communication comprises valve means adapted to open in response to pressure in the gas chamber exceeding the pressure in the metering chamber by a predetermined amount.

Preferably, the metering member extends into the gas supply chamber and has a passage extending substantially longitudinally therethrough, and the means to establish said gas flow communication is located in said passage.

The incorporation of the valve in the metering member, and the operating of the valve in response to the pressure in the gas supply chamber avoids the need for a relatively complex valve actuating mechanism operated from outside of the gas supply chamber and connected to a valve member mounted in the movable metering member. The absence of valve mechanisms externally connected to the metering member also reduces frictional and inertia forces acting on the metering member and enables more accurate and sensitive response of the metering member to vary the metered quantity of liquid. Also a measure of gas pressure balancing on the metering member is achieved which reduces the forces to be managed by the control system.

The means to control the movement of the metering member includes an actuator member supported in the body for movement relative thereto and having portion thereof projecting into the further chamber, said portion being operably connected within said further chamber to the metering chamber, so that movement of said actuator member relative to the body effects said linear movement of the metering member.

As the introduction of a gas under pressure, such as air, into the metering chamber is employed to deliver the metered quantity of liquid from the metering chamber and as the metered quantity is the liquid in the chamber between the end of the metering member and the discharge port in the metering chamber, leakage about the metering rod between the metering chamber and the further chamber, will not result in inaccuracy in the metering quantity of fuel. Also leakage of gas from the gas supply chamber to the further chamber about the metering member is acceptable as it will not adversely affect the operation and accuracy of the apparatus.

The tolerance of the apparatus to leakage from both the metering and gas supply chambers to the further chamber enables simple bearings to be used to slidably support the metering member without fluid seals. In addition to cost savings, this also substantially reduces frictional resistance to movement of the metering member and so improves the sensitivity and accuracy of the metering member to adjustments in the metered quantity of liquid.

One practical arrangement of the metering apparatus will now be described with reference to the accompanying drawings. This apparatus is intended for use in metering fuel in a fuel injection system for a six cylinder internal combustion engine. It is however to be understood that the apparatus may be used in wide range of applications wherein delivery of a variable quantity of liquid is required.

Figure 1:
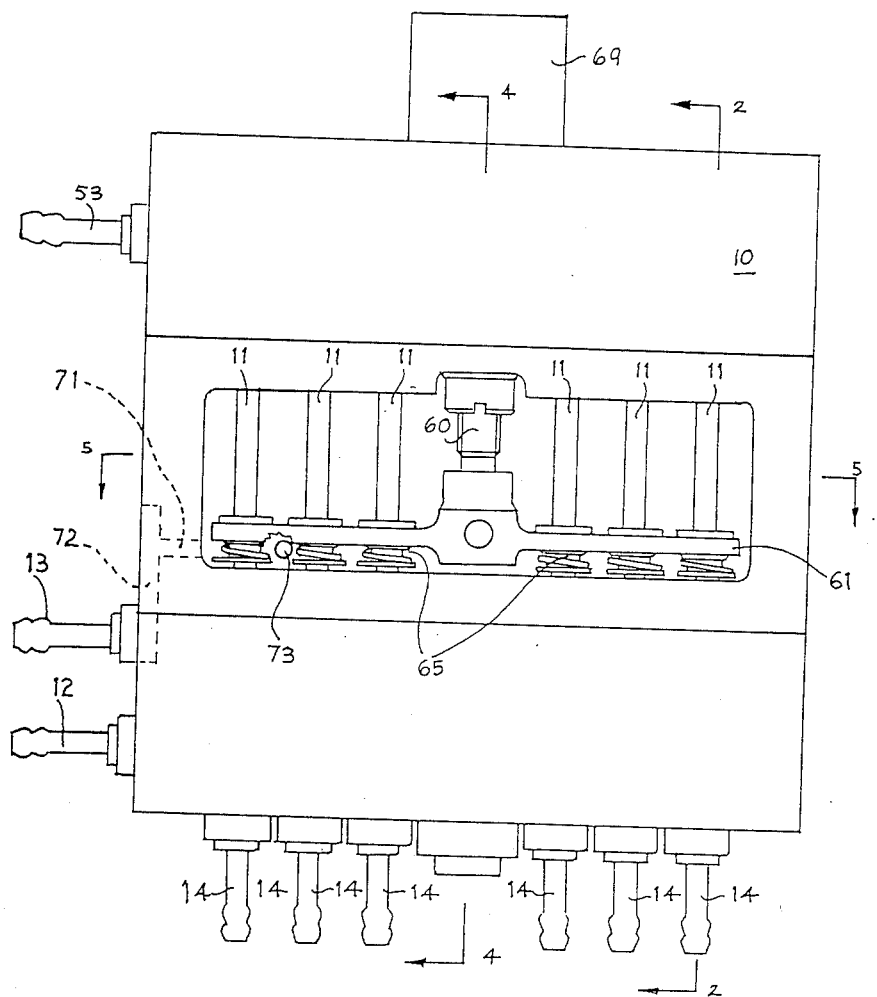
FIG. 1 is a side view of the apparatus.

Referring now to the drawings, and initially to FIG. 1, the metering apparatus comprises a body 10 having incorporated therein six individual metering units 11 arranged in side by side parallel relationship. The nipples 12 and 13 are adapted for connection to a fuel supply line and fuel return line respectively, and communicate with respective galleries within the block 10 for the supply and return of fuel from each of the metering units 11. Each metering unit 11 is provided with an individual fuel delivery nipple 14 to which a line may be connected to commuunicate the metering unit with the injection nozzle.

Figures 2, 3:
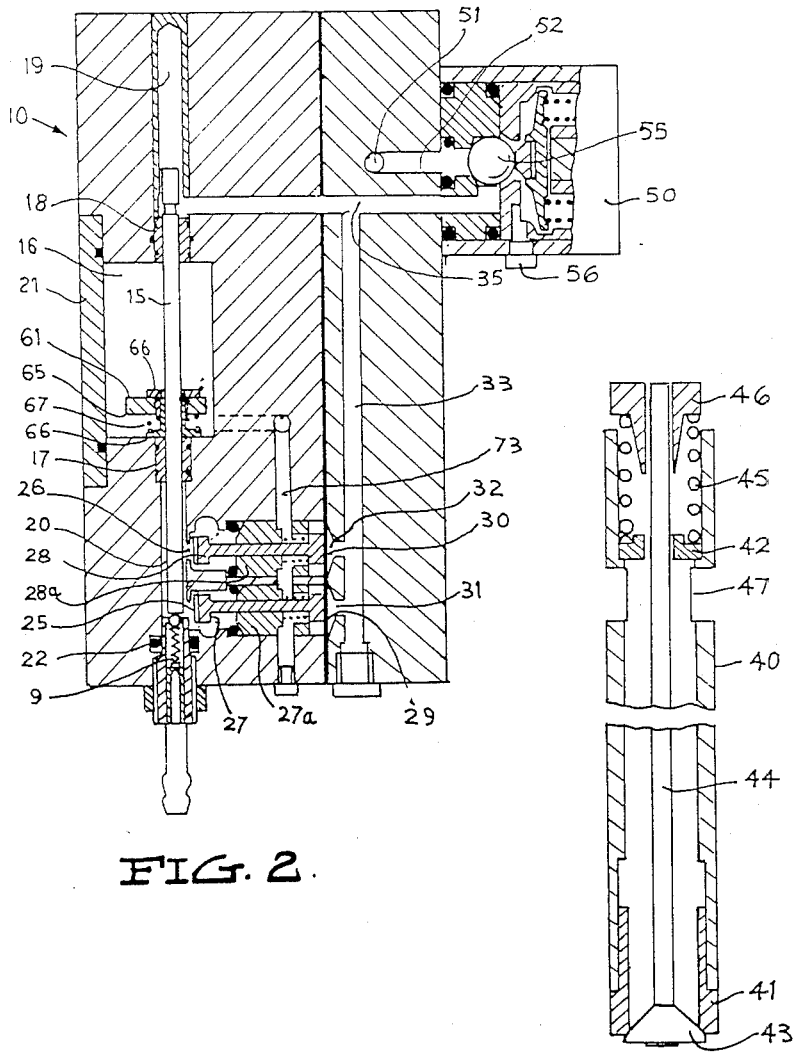
FIG. 2 is a sectional view of the apparatus along line 2—2 in FIG. 1.
FIG. 3 is an enlarged longitudinal sectional view of metering rod.
Figure 4:
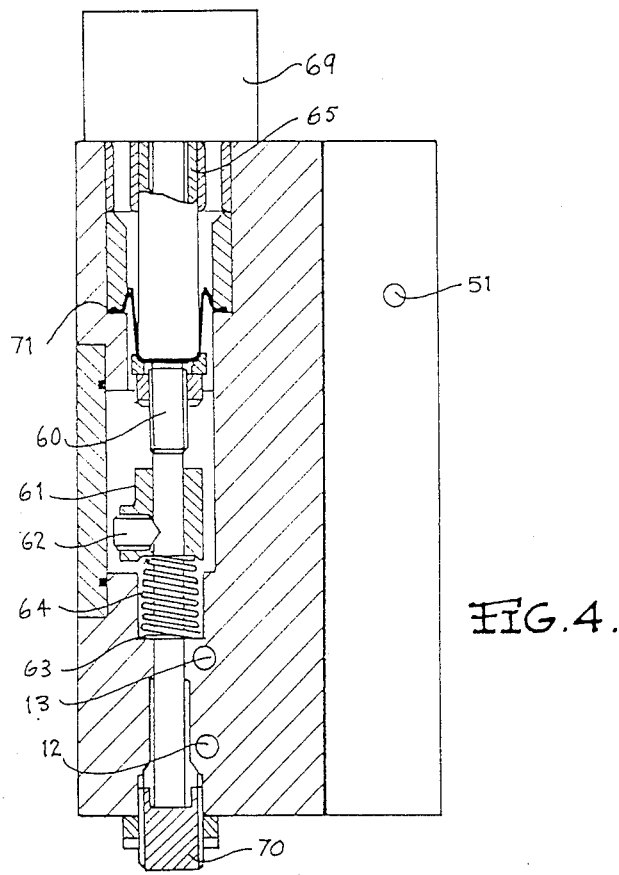
FIG. 4 is a sectional view of the apparatus along line 4—4 in FIG. 1.
Figure 5:
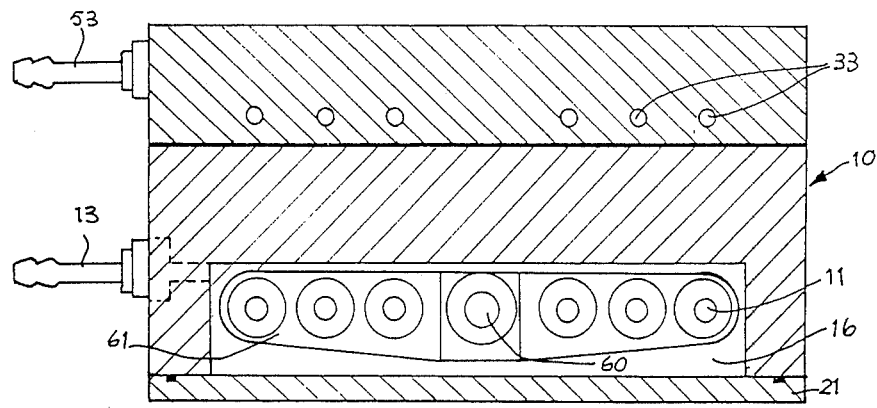
FIG. 5 is a sectional view of the apparatus along line 5—5 in FIG. 1.

FIG. 2 is a sectional view along the axis of one of the metering units 11 showing the metering rod 15 supported for sliding longitudinal movement in the bearings 17 and 18 and extending into the air supply chamber 19 and metering chamber 20. The internal construction of the metering rod 15 will be described later. Each of the six metering rods 15 pass through the common leakage collection chamber 16 which is formed by a cavity provided in the body 10 and the coverplate 21 attached in sealed relation to the body 10.

Each of the nipple units 14 is secured in the body 10 with a seal 22 therebetween. Each nipple unit 10 has incorporated therein a one way valve 9 which opens upon the pressure in the metering chamber 20 reaching a predetermined level, so that fuel and air in the metering chamber may be delivered through the nozzle unit 14.

Each metering chamber 20 has a respective fuel inlet port 25 and a fuel outlet port 26 controlled by respective valves 27 and 28. Each of the valves 27 and 28 are spring-loaded to an open position, and are closed in response to the application of gas pressure to the respective diaphragms 29 and 30 located in diaphragm cavities 31 and 32. Each of the diaphragm cavities are in constant communication with the air conduit 33 and the conduit 33 is also in constant communication with the air supply chambers 19 by the conduit 35.

An enlarged sectional view of the metering rod 15 is shown in FIG. 3. The rod being formed from a tubular member 40 having a valve seat insert 41 in the lower end and a spring seat insert 42 in the upper end. The valve element 43 is carried by the valve stem 44 which extends axially through the tubular member 40. The spring 45 is located within the upper end of the tubular member 40 about the stem 44, and cooperates with the second spring seat 46 attached to the end of the stem 44. Diametrically opposite openings 47 are provided in the wall of the tubular member 40 so as to provide a free communication between the air supply chamber 19 and the interior of the tubular member 40 as seen in FIG. 2. The spring 45 is pre-stressed to normally hold the valve element 43 against the seat 41, and upon the pressure in the air supply chamber 19 reaching a pre-determined pressure, the valve element 43 will be moved clear of the valve seat 41 so that air may pass from the air supply chamber 19 through the tubular member 40 into the metering chamber 20.

The control of the supply of air to the conduit 35, and hence the supply of air to the supply chamber 19 and the diaphragm cavities 31 and 32, is controlled in time relation with the cycling of the engine through the solenoid operated valve 50. Individual solenoid valves may be provided for each metering unit 11 or two or more metering units may be controlled by the same solenoid valve depending upon the number of metering units incorporated in the body 10, and the timing cycle of the cylinders of the engine to which the fuel is being metered. In the current embodiment an individual solenoid valve 50 is provided for each metering unit. The common air supply conduit 51 runs through the body with respective branches 52 providing air to each solenoid valve. The connecting nipple 53 is provided on the external end face of the body 10 for coupling by a suitable line to the air supply.

The valve element 55 of the solenoid valve 50 is held in a position to isolate the air supply duct 51 from the conduit 35 when the solenoid is activated, and at the same time the conduit 35 is connected to the vent 56. When the solenoid is de-activated, the pressure of the air in the supply duct 51 will move the valve element 55 into a position so as to isolate the conduit 35 from the vent 56 and couple the air supply duct 51 to the conduit 35. Thus, in this position the compressed air is supplied to the diaphragm cavities 31 and 32 and the air supply cavity 19. This supply of the compressed air to the diaphragm cavities 31 and 32 will effect closing of the fuel inlet and outlet ports 25 and 26 and move the valve element 43 in the metering rod 15 to the open position. Accordingly, air under pressure is admitted to the metering chamber 20 so that the pressure therein is sufficient to open the valve 9 to effect delivery of the fuel therein to the engine via the nipple 14. Further information in regard to the basic operation of the metering of the fuel to the engine can be obtained from the Australian Patent No. 523,968 previously referred to.

Referring now to FIGS. 1, 2, 4 and 5, the control of the degree of projection of the metering rods 15 into the respective metering chambers 20, is regulated by the actuator rod 60 sidably supported in the body 10 parallel to the metering rods 15. The actuator rod 60 is connected to each of the metering rods 15 by the cross-head 61. The cross-head 61 is secured in a fixed location on the actuator rod 60 by the set screw 62, and the return spring 63 located about the actuator rod 60 is seated in the recess 64 in the body and abutts the underface of the central portion of the cross-head 61. The spring 63 is stressed so as to urge the actuator rod 60 the cross-head 61, and hence each of the metering rods 15, in an upward direction as viewed in FIGS. 1 and 4, to thereby reduce the degree of projection of the metering rods 15 into the metering chambers 20, and hence increase the quantity of fuel to be delivered during each injection cycle.

In FIG. 2 the metering rod 15 is shown in its lowermost position, and each metering rod 15 carries a sleeve 65 clamped thereto with a flange 66 at either end of the sleeve. Each of the sleeves 65 are located in respective apertures in the cross-head 61, with the upper flange 66 bearing against the top face of the cross-head, and a spring 67 located between the lower flange 66 and the underface of the cross-head. The springs 67 are of sufficient strength so that under normal operating conditions the sleeves 65 and metering rods 15 will not move in the longitudinal direction relative to the cross-head 61 and so the metering rods will truly follow the movement of the actuator rods 60 and cross-head 61. However, the springs avoid the necessity of a rigid connection between the cross-head 61 and the sleeve 65 and so accommodate manufacturing tolerances in the respective components.

The upper end 68 of the actuator rod 60 is coupled to the movable armature of the electro-magnetic motor 69 or other suitable driving device which, when energised, forces the actuator rod 60 downwardly against the action of the spring 63. Electrical energy is supplied to the motor 69 in proportion to the fuel demand of the engine, and the extent of downward movement of the actuator rod 60, and hence of each of the metering rods 15 is proportional to the energy supplied to the motor 69. The limit of downward movement of the actuator rod 60 is regulated by the adjustable stop 70 mounted in the body 10. The bellows type seal 71 interposed between the actuator rod 60 and the body 10 protects against the fuel and contaminated air within the leakage chamber 16 entering the motor 69.

The bearings 17 and 18, which slidably support the metering rod 15, are not intended to provide a seal against leakage of air or fuel from the air supply or metering chambers. Accordingly, the fit between the metering rod 15 and the bearings 17 and 18 may be selected so that frictional resistance to the sliding of the metering rod 60 is very low.

The air and fuel leakage is collected in the chamber 16 and is drained therefrom through the conduit 71 into the cavity 72 which communicates with the fuel return nipple 13. The conduit 73 provides communication between the diaphragms 29 and 30, on the side opposite to the cavities 31 and 32, and the chamber 16. This allows drainage of fuel that leaks between the stems of the valves 27 and 28 and their guides 27 and 28a, so as to avoid an accumulation of liquid in this area that would prevent correct operation of the diaphragms 29 and 30 to close the valves 27 and 28.

It will be appreciated that the collection of the fuel leakage and the feeding of it to the fuel return nipple and hence returned to the fuel supply. This avoids pollution of the atmosphere by the leaked fuel, and contributes to the overall fuel efficiency of the engine.

I claim:

1. Apparatus for delivering metered quantities of fuel to an internal combustion engine, said apparatus comprising:
   a rigid body having a metering chamber and a gas supply chamber therein;
   a metering member supported in the body for linear movement relative thereto and adapted to selectively provide gas flow communication between the gas supply chamber and the mtering chamber;
   said metering member extending into the metering chamber in the direction of said linear movement;
   control means to control the linear movement of the metering member in the body to regulate the extent of projection thereof into the metering chamber;
   means communicating said with metering chamber and connectable to a fuel source to permit supply of fuel to the metering chamber;
   means carried by the metering member and operable to selectively establish said gas flow communication between the metering and gas supply chambers, whereby fuel is displaceable from the metering chamber by gas from the gas supply chamber; and
   leakage collection means in said body and interposed between said gas supply chamber and said metering chamber, with said metering member extending therethrough, for collection in a separate chamber of leakage from said metering chamber and said gas supply chamber, said separate chamber being isolated from said metering chamber and said gas supply chamber.

2. Apparatus as claimed in claim 1 wherein the metering member extends into the gas supply chamber and has a passage extending substantially longitudinally therethrough, and the means to establish said gas flow communication is located in said passage.

3. Apparatus as claimed in claim 1 wherein the means to establish said gas flow communication comprises valve means adapted to open in response to pressure in the gas chamber exceeding the pressure in the metering chamber by a predetermined amount.

4. Apparatus as claimed in claim 3 wherein the metering member extends into the gas supply chamber and has a passage extending substantially longitudinally therethrough, and the means to establish said gas flow communication is located in said passage.

5. Apparatus as claimed in claim 1 wherein said leakage collection means is adapted for connection to a gas and liquid drain.

6. Apparatus as claimed in claim 1 wherein said control means are operably connected to the metering member within said leakage collection means.

7. Apparatus as claimed in claim 6 wherein said control means includes an actuator member supported in the body for movement relative thereto and having portion thereof projecting into the leakage collection means chamber, said portion being operably connected within said chamber to the metering member, so that movement of said actuator member relative to the body effects said linear movement of the metering member.

8. Apparatus as claimed in claim 7 wherein the actuator member is supported in the body for linear movement relative thereto in a direction parallel to said linear movement of the metering member.

9. Apparatus as claimed in claim 1 wherein the rigid body has formed therein a plurality of independent metering chambers and a corresponding number of independent gas chambers and metering members one of each associated with each metering chamber, said leakage collection means being interposed between the metering chambers and the associated gas chambers and each metering member extending through said leakage collection means.

10. Apparatus as claimed in claim 9 where said actuator member is operably connected to all said metering members.

11. Apparatus as claimed in claim 1 including means operable to selectively admit gas to said gas chamber, or to a predetermined number of said gas chambers.

12. Apparatus as claimed in claim 1 including a selectively openable individual discharge port in communication with the or each metering chamber, to permit delivery of liquid therefrom.

13. Apparatus as claimed in claim 12 wherein the or each discharge port is opened in response to the pressure in the communicating metering chamber when gas is admitted thereto from its associated gas chamber.

14. Apparatus as claimed in claim 12 wherein the or each metering chamber and the metering member projecting thereinto are adapted so the extent of projection of the metering member into the metering chamber adjusts the quantity of liquid displaceable from the metering chamber by the admission of the gas thereto.

15. Apparatus for delivering metered quantities of liquid comprising:
   a rigid body having a metering chamber and a gas supply chamber therein;
   a metering member supported in the body for linear movement relative thereto and adapted to selectively provide gas flow communication between the gas supply chamber and the metering chamber;
   said metering member extending into the metering chamber in the direction of said linear movement;
   control means to control the linear movement of the metering member in the body to regulate the extent of projection thereof into the metering chamber;
   means communicating with said metering chamber and connectable to a liquid source to permit supply of liquid to the metering chamber;

means carried by the metering member and operable to selectively establish said gas flow communication between the metering and gas supply chambers, whereby liquid is displaceable from the metering chamber by gas from the gas supply chamber; and leakage collection means in said body and interposed between said gas supply chamber and said metering chamber, with said metering member extending therethrough, for collection in a separate chamber of leakage from said metering chamber and said gas supply chamber, said separate chamber being isolated from said metering chamber and said gas supply chamber.

* * * * *